Patented Mar. 6, 1951

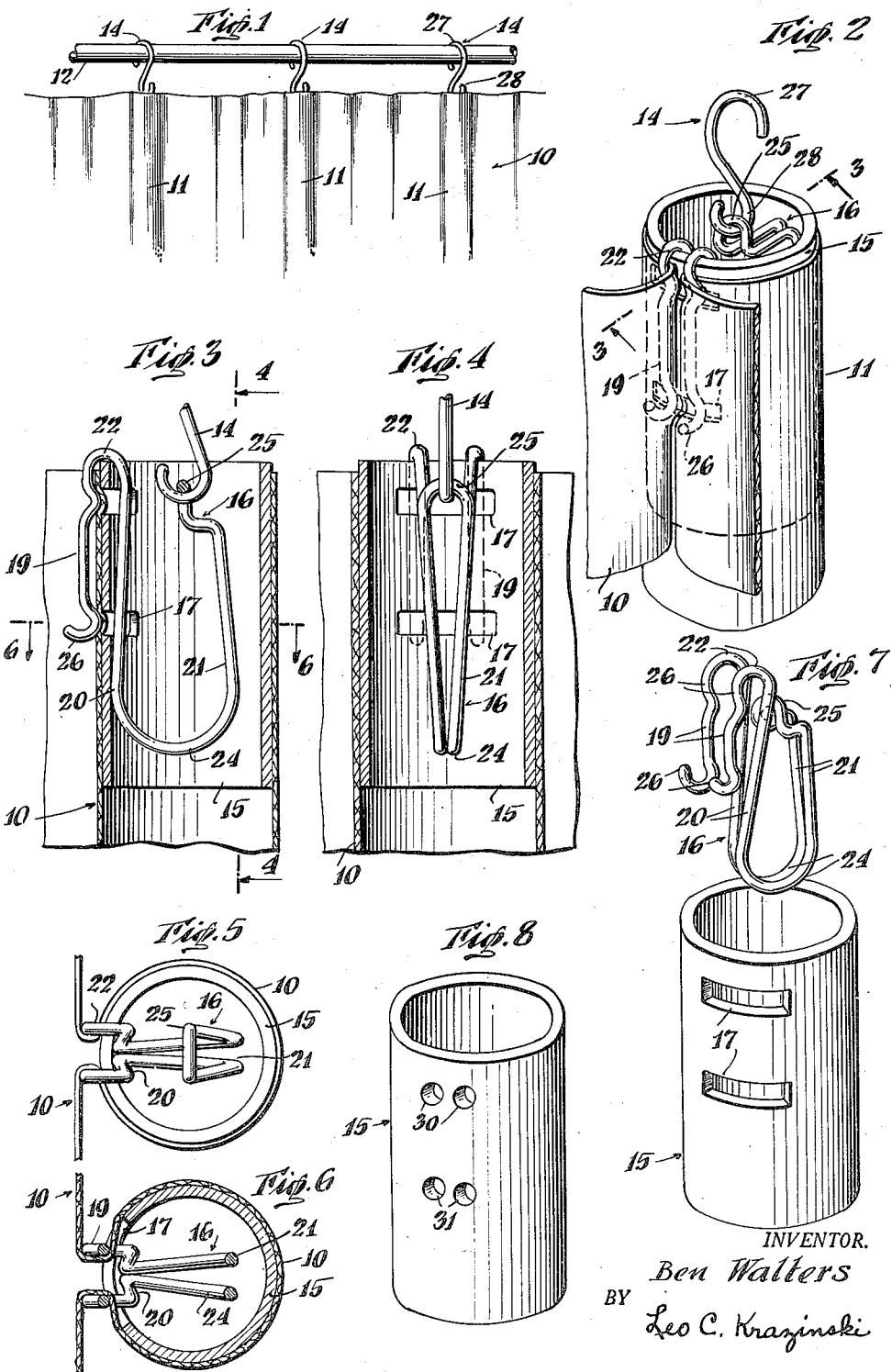

2,544,516

UNITED STATES PATENT OFFICE 2,544,516

DRAPERY SHAPER

Ben Walters, New York, N. Y.

Application March 16, 1948, Serial No. 15,191

2 Claims. (Cl. 160—348)

The present invention relates to drapery shaping devices and the like, and more particularly to an improved device for forming pleats in drapes, portières, curtains, wall hangings, etc. and for suspending the same from a support.

An object of the present invention is to provide a drapery shaper and hanger which is constructed of a minimum number of parts.

Another object is to provide a drapery shaper constructed of parts which are relatively simple and can be manufactured economically.

Still another object is to provide a drapery shaper which is readily assembled to form pleats in the drapery or the like without the exercise of a high degree of skill.

Yet another object is to provide a device of the foregoing character which forms attractive pleats and maintains the pleats effectively.

A further object is to provide a device of the foregoing character which permits the drapery to be moved or rearranged on its support without disturbing the pleats formed therein.

Still a further object is to provide a drapery shaper and hanger which is substantially concealed by the drapery when in use.

Other and further objects will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein:

Figure 1 is a fragmentary elevational view illustrating a drape supported by devices in accordance with the present invention.

Figure 2 is a perspective view illustrating one of the drapery shaping and supporting devices applied to the drape as seen from the rear thereof.

Figure 3 is a sectional view taken substantially along the line 3—3 on Figure 2.

Figure 4 is a sectional view taken along the line 4—4 on Figure 3.

Figure 5 is a plan view of the device as seen from the top.

Figure 6 is a sectional view taken along the line 6—6 on Figure 3.

Figure 7 is an exploded perspective view of the device prior to being applied to the drape.

Figure 8 is a perspective view of a modified element constituting a part of the device.

Referring to the drawing in detail and, particularly to Figure 1 thereof, there is shown a portion of a drape 10, or the like, formed with pleats 11 and suspended from a bar or rod 12 by devices in accordance with the invention of which only the supporting hooks 14 are visible.

As shown in Figures 2 to 7, the device generally comprises a tubular member 15 for forming the pleats, a clip 16 for attaching the drape 10 to the tubular member 15, and the hook 14, previously mentioned, which interconnects the clip 16 and the rod 12.

The tubular member 15 preferably is a cardboard or paper tube although it may be constructed of plastic material, or metal, if desired. The tubular member is shown as having a cylindrical side wall formed at the rear thereof with aperture means such as one or a pair of peripherally extending apertures, slots, or recesses 17 spaced longitudinally from each other. As will be noted, the shape of the tubular member determines the shape and aesthetic effect of the pleat, hence it will be appreciated that pleats of other shapes may be readily provided by utilizing tubular members which are triangular, rectangular, or elliptical in cross-sections, or have other forms. It is to be further noted that the recesses 17 may be mere indentations in the wall of the tubular member 15.

The clip 16 comprises a pair of outer leg portions 19, a pair of intermediate leg portions 20, and a second pair of outer leg portions 21. Preferably, the clip is formed of one piece of relatively stiff wire bent into a generally S-like shape, with the upper ends of the portions 19 and 20 being connected by an inverted U-portion 22, the lower ends of the portions 20 and 21 being connected by a U-portion 24 and upper ends of the portions 21 being connected to each other by an inverted U-like hook 25, the function of which will be described hereinafter. The leg portions 19 are formed with one or more projections 26, the number provided depending upon the number of aperture means, such as the slots 17, and are adapted to cooperate therewith in the manner about to be described. The leg portions 19 and 20 are closely spaced to provide a clipping or clamping effect when the side wall of the tubular member 15 is inserted therebetween.

The hook 14 is generally S-shaped and comprises an upper hook portion 27 adapted to extend over the bar or rod 12, and a lower hook portion 28 inserted through the loop 25 to support the clip 16.

In assembling the device to form the pleats in the drape, the portion of the drape in which the pleat is to be formed is positioned about the exterior of the tubular member 15 with the drape brought together at the rear of the tubular member substantially at the middle of the slots 17 (Figures 2, 5 and 6). The clip 16 is then applied by inserting the leg portions 20 and 21 into the tubular member and positioning the leg portions 19 over the drape at the exterior of the tubular member with one of the leg portions 19 at each side of the portions of the drape which are brought towards each other (Figures 2, 5 and 6). As the clip portions 19 and 20 are disposed over the drape and tubular member, the inverted U-shaped portions 22 engage and rest upon the upper edge of the side wall of the tubular member, thus acting as stops; and the projections 26 force portions of the drape into the slot or recesses 17 to cooperate therewith and together with the leg portions, so as to secure the drape and clip on the tubular member in locking engagement.

When the device is assembled, as just described, the loop 25, because of the construction and arrangement of the clip, is disposed just below the upper edge of the side wall of the tubular member thereby concealing the clip. The drape is adapted to be suspended, as shown in Figure 1, by inserting the hook portions 28 into the loop 25 and placing the hook portions 27 over the bar or rod 12.

In Figure 8, a modified form of tubular member 15 is illustrated, wherein the aperture means comprises a pair of peripherally spaced apertures or recesses 30 and a second pair of laterally or peripherally spaced apertures or recesses 31 spaced longitudinally from the apertures 30. The apertures 30 and 31 are each adapted to receive a portion of the drape forced therein by one of the projections 26 of the clip portions 19.

While the clip has been described as a unitary member having pairs of portions 19, 20 and 21, it will be appreciated that two clips could be utilized which are substantially S-shaped and each have a portion 19, a portion 20 and a portion 21 formed with a loop or eye at the upper end through which the hook portion 28 is inserted to connect the individual clips. While the clip may be modified as suggested above without sacrificing the more important advantages of the present invention, a unitary clip is preferred because of greater rigidity and clipping effect and convenience of handling and assembling.

From the foregoing description, it will be seen that the present invention provides an improved drapery shaping and suspending device which is simple and practical in construction and can be economically manufactured and can be readily applied in a simple and convenient manner. The drapery is effectively shaped and is securely retained in its assembled relation even if subjected to rough handling as may occur in its normal usage.

As various changes may be made in the form, construction and arrangement of the parts herein, without departing from the spirit and scope of the invention and without sacrificing any of its advantages, it is to be understood that all matters are to be interpreted as illustrative and not in any limiting sense.

I claim:

1. A drapery shaper comprising a tubular member having aperture means in the side wall thereof, and a generally S-shaped clip having a pair of outer portions each provided with a projection adapted to cooperate with said aperture means to secure drapery to said tubular member, said clip having a pair of intermediate portions cooperating with said outer portions to engage the side wall therebetween and having a second pair of outer portions disposed in said tubular member and formed with a connecting loop portion at one end thereof, and a supporting hook having a portion engaging said loop portion.

2. A drapery shaper comprising a tubular member having a pair of longitudinally spaced aperture means in the side wall thereof, a generally S-shaped clip having a pair of outer portions each provided with a pair of projections adapted to cooperate with said aperture means to secure drapery to said tubular member, said clip having a pair of intermediate portions cooperating with said outer portions to engage the side wall therebetween and having a second pair of outer portions disposed in said tubular member and formed with a connecting loop portion at one end thereof, and a supporting hook having a portion engaging said loop portion.

BEN WALTERS.

REFERENCES CITED

The following references are of record in the file of this patent:

UNITED STATES PATENTS

| Number | Name | Date |
| --- | --- | --- |
| 1,158,940 | Litt et al. | Nov. 2, 1915 |
| 1,819,240 | Harrison | Aug. 18, 1931 |
| 1,863,638 | Richter | June 21, 1932 |
| 1,868,944 | Jones | July 26, 1932 |
| 2,181,813 | Kaufman | Nov. 28, 1939 |